United States Patent Office 3,518,250
Patented June 30, 1970

3,518,250
SUBSTITUTION OF IMINO-HETEROCYCLIC COMPOUNDS
Robert R. Schumaker, Los Gatos, Calif., assignor to International Business Machines Corporation, Armonk, N.Y., a corporation of New York
No Drawing. Filed Dec. 17, 1965, Ser. No. 514,708
Int. Cl. C07b 27/00
U.S. Cl. 260—239    5 Claims

ABSTRACT OF THE DISCLOSURE

Alkylation of nitrogen heterocyclic compounds in a medium of dimethyl sulfoxide and aqueous alkali.

---

The present invention generally relates to the substitution of imino-heterocyclic compounds and, more particularly, relates to the substitution of the hydrogen on the imino group of the heterocyclic compound with a methylene carbon.

Prior art methods of carrying out such substitutions consist of, for example, reacting carbazole with dimethylaminoethyl chloride in a solution of benzene and in the presence of sodamide. Total time for the reaction takes about ten hours and has to be carried out under anhydrous conditions.

Accordingly, it is a primary object of the present invention to provide a method for substituting the hydrogen of the imino group of the heterocyclic compound with a methylene carbon which only requires a relatively short reaction time.

It is a further object of the present invention to provide a method for substituting the hydrogen of the imino group of the heterocyclic compound with a methylene carbon which is highly efficient at low temperatures and can be carried out under nonanhydrous conditions.

The foregoing and other objects of the present invention are achieved by carrying out the substitution in a reaction solvent of dimethyl sulfoxide. In general, the method of the present invention is as follows:

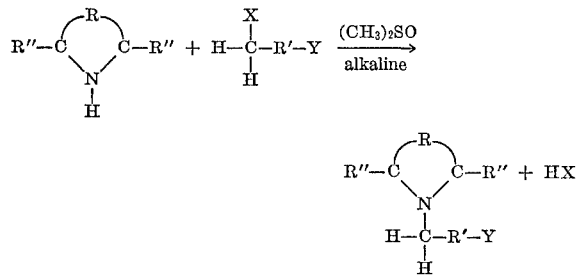

wherein R is the atoms necessary to complete a heterocyclic ring with $C_2NH$; R' is selected from the group consisting of alkyl, alkenyl, and aryl; R" is selected from the group consisting of hydrogen, alkyl, aryl, and benzo; X is halogen; and Y is hydrogen, alkyl, phenyl, hydroxyl, amino, alkoxy, and alkoxyphenyl.

More specifically, the solution of the heterocyclic compound in a mixture of dimethyl sulfoxide and a strongly alkaline acid acceptor or strong base, such as aqueous sodium hydroxide, is treated with the halide containing the methylene carbon at a temperature above about 50° C. Other acid acceptors useful in the method of the present invention are potassium hydroxide, lithium hydroxide, tetramethylammonium chloride, and benzyltrimethylammonium hydroxide.

It is preferred to carry out the reaction with one equivalent of the acid acceptor, such as 50% sodium hydroxide, per mole of the heterocyclic compound. In general, the reaction takes less than ten minutes and usually takes about five minutes or less. With most compounds, a color change can be observed when the reaction is completed.

Imino-heterocyclic compounds which can be used in the process of the present invention fall within the general formula:

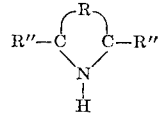

wherein R and R" are the same as defined above. Examples of these compounds are acridone, phenoxazine, indole, naphthazole, carbazole, phenothiazone, pyrrole, 1,4-thiazine, 2,5-dimethyl pyrrole, 2,5-diphenyl pyrrole, 3,5-diethyl-1,4-thiazine, 3,5-diphenyl-1,4-thiazine, 10,11-dihydro - 5H - dibenzo[b,f]azepine, 5H - dibenzo[b,f]-azepine, 5,11 - dihydrobenzo[b]pyrido[2,3-e]-1,4-thiazepine, 5,11-dibenzo-[b,f]-1,4-thiazepine, 5H-dibenzo[b,e]-1,4-diazepine, 9-(2-dimethylamino)carbazole, N-methylphenothiazone, N-methallylphenothiazine, N-(2-hydroxyethyl)-carbazole, N-(3 - m - methoxyphenyl)-propylcarbazole, N-(5-hexenyl)carbazole, 9-(2'-pyridyl)-carbazole.

Substituents containing a methylene carbon which can be substituted on the nitrogen of the heterocyclic compound fall within the general formula:

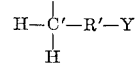

wherein C, R' and Y are the same as defined above.

Examples of these substituents are: 3-ethoxy propyl, 2-methoxy butyl, 2-phenoxy pentyl, methyl, ethyl, propyl, butyl, pentyl methallyl, 2-dimethylaminoethyl, 2-hydroxyethyl, m-methoxyphenylpropyl, 5-pentenyl, 5-hexenyl, and pyridyl.

The following examples illustrate the invention and compare it with the method of prior art. The details of these examples, however, are not to be construed as limiting the invention.

EXAMPLE I (PRIOR ART)

To 16.7 g. (0.1 mole) of carbazole in 100 ml. benzene was added 4.7 g. (1.12 mole) sodamide. The mixture was refluxed for 2 hours. Then 7 g. of 2-dimethylaminoethyl chloride was added and the refluxing continued for 8 hrs., after which the mixture was cooled. The NaCl was removed by filtration and the benzene by distillation. Addition of an excess of HCl yielded a white crystalline 9-(2-dimethylaminoethyl)carbazole-HCl salt. M.P. 240–242° C. Total reaction time: 10 hrs.

EXAMPLE II (COMPARISON)

To prepare 9-(2-dimethylaminoethyl)carbazole-HCl by the process of the present invention, 21.67 g. of carbazole (0.01 mole) in 100 ml. of dimethyl sulfoxide which was added 1.44 g. (0.01 mole) of 2-dimethylaminoethyl chloride-HCl. The solution was heated to 100° C. and 1.6 g. of 50% sodium hydroxide was added. The solution then was heated to 160° C. and stirred for 5 minutes, after which the solution was cooled and poured into $H_2O$. The solids obtained were filtered with suction and extracted with hexane which was removed under vacuum and the oil remaining was taken up in diethyl ether. Upon the addition of concentrated HCl dropwise to the ether, a white precipitate of 9-(2-dimethylaminoethyl)carbazole-HCl was obtained which melted at 240° C. Yield=36%. Total reaction time: 5 minutes.

EXAMPLE III

A solution of 5 g. phenothiazine and 15 ml. dimethylsulfate in 75 ml. dimethyl sulfoxide was stirred while adding 30 g. 50% sodium hydroxide. After 2-3 minutes an exothermic reaction took place. When the reaction subsided, the solution was then poured into 500 ml. water. The white crystalline product of N-methylphenothiazine was filtered off and recrystallized from 95% ethanol. M.P. 98.5–100° C. Yield=60%.

EXAMPLE IV

To a solution of 7.5 g. phenothiazine and 7.0 g. methallylchloride in 75 ml. dimethyl sulfoxide was added 15 g. 50% sodium hydroxide. The solution was stirred and heated until the reaction started. Heating was continued (100° C.) for five minutes and the reaction mixture was then poured into water. An oil separated and then crystallized. The product of N-methallylphenothiazine was recrystallized from petroleum ether. M.P. 50° C. Yield=60%.

EXAMPLE V

A solution was prepared of 7.5 g. carbazole and 7 g. 2-chloroethanol in 75 ml. dimethyl sulfoxide. To this was added 15 ml. 50% sodium hydroxide and the solution was heated to 80° C., and this temperature was maintained for 5 minutes. Upon pouring the solution into water, an oil separated. The oil was isolated and dried. Repeated crystallizations from benzene-petroleum ether resulted in colorless needles of N-(2-hydroxyethyl)-carbazole. M.P. 80° C. Yield=40%.

EXAMPLE VI

To a solution of 1.67 g. carbazole in 50 ml. dimethyl sulfoxide was added 2.5 g. 50% sodium hydroxide. After 5 minutes, 3.44 g. 1-bromo-3-(m-methoxyphenyl)-propane was added and the mixture was heated to 80° C. for 5 minutes. The solution was then poured into 200 ml. water. Extraction with ether yielded a product of N-(3-m-methoxyphenyl)-propylcarbazole which was recrystallized from 95% ethanol. M.P. 63–64° C. Yield=50%.

EXAMPLE VII

To a solution of 1.67 g. of carbazole and 1.8 g. of 1-bromohexene-5 in dimethyl sulfoxide, which was heated to 100° C., was added 0.8 g. of 50% sodium hydroxide. After heating to 100° C. for five minutes, the solution was cooled and poured into water. From the oily solids which precipitated, N-(5-hexenyl)carbazole was extracted with N-hexane and crystallized from that solvent at Dry Ice temperature. M.P. 76–76.5° C. Yield=50%.

EXAMPLE VIII

To 1.58 g. of 2-bromopyridine and 1.67 g. of carbazole in dimethyl sulfoxide, which was heated to 160° C., was added 0.8 g. of 50% sodium hydroxide. The solution was stirred and refluxed for ten minutes, cooled and poured into water. 9-(2-pyridyl)-carbazole was extracted with benzene from the oily precipitate and recrystallized from hexane at low temperatures. M.P. 70–71° C. Yield=30%.

EXAMPLE IX

To 1.95 g. of acridone and 1.5 g. of ethylbromide in 100 ml. of dimethyl sulfoxide at 50° C. was added 0.8 g. of 50% sodium hydroxide. The solution was heated to 120° C. for ten minutes, cooled and poured into water. The N-ethyl acridone was extracted from the precipitate with acetone and recrystallized with hexane. M.P. 156–158° C. Yield=1.0 g. (45%).

EXAMPLE X

To 1.67 g. of carbazole and 1.5 g. of ethyl bromide in 75 ml. of dimethyl sulfoxide was added 0.8 g. of 50% sodium hydroxide. This solution was heated to 80–100° C. for five minutes, cooled and poured into water. The N-ethyl carbazole was extracted and recrystallized from the crude product with N-hexane. M.P. 68–70° C. Yield =1.1 g. (56%).

While the invention has been particularly shown and described with reference to preferred embodiments thereof, it will be understood by those skilled in the art that variations in form may be made therein without departing from the spirit and scope of the invention.

What is claimed is:

1. The method of preparing heterocyclic compounds of the formula:

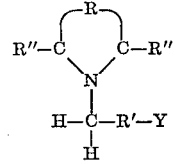

wherein R is the atoms necessary to complete a heterocyclic ring with $C_2NH$; R' is selected from the group consisting of alkyl, alkenyl, and aryl; R" is selected from the group consisting of hydrogen, alkyl, aryl, and benzo; and Y is selected from the group consisting of hydrogen, alkyl, phenyl, hydroxy, amino, alkoxy, and alkoxyphenyl; comprising the steps of:

reacting a heterocyclic compound of the formula:

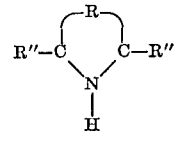

wherein R and R" are the same as above, with a halide of the formula:

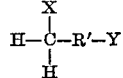

wherein R' and Y are the same as above, and X is halogen, in a reaction solvent of dimethyl sulfoxide and an equivalent amount of 50% aqueous alkali hydroxide.

2. The method of claim 1 wherein the reaction is carried out at a temperature above about 50° C.

3. The method of claim 1 wherein the reaction is completed in less than ten minutes.

4. The method of claim 1 wherein R' is alkyl, R" is benzo, and Y is hydrogen.

5. The method of claim 1 wherein R' is alkenyl, R" is benzo, and Y is hydrogen.

References Cited

Parker, Quarterly Reviews, vol. 16, pp. 176–182 and 187 (1962).

Ross et al., J. Am. Chem. Soc., vol. 83, pp. 2133–2136 (1961).

Zaugg et al., J. Org. Chem., vol. 23, pp. 1389–1390 (1958).

ALTON D. ROLLINS, Primary Examiner

U.S. Cl. X.R.

260—243, 244, 279, 294.8, 296